United States Patent
Loveless et al.

(10) Patent No.: US 12,409,481 B2
(45) Date of Patent: Sep. 9, 2025

(54) COMPOSITION AND METHOD FOR BREAKING DOWN CROP RESIDUE AND ADDING NUTRIENTS TO SOIL

(71) Applicant: Meristem Crop Performance Group, LLC, Powell, OH (US)

(72) Inventors: Lucas Loveless, Chatham, IL (US); Larry Fiene, Prairie Du Sac, WI (US); Joe Gednalske, River Falls, WI (US); Brian Haschemeyer, Athens, IL (US)

(73) Assignee: Meristem Crop Performance Group, LLC, Powell, OH (US)

( * ) Notice: Subject to any disclaimer, the term of this patent is extended or adjusted under 35 U.S.C. 154(b) by 0 days.

(21) Appl. No.: 17/696,381

(22) Filed: Mar. 16, 2022

(65) Prior Publication Data
US 2023/0149992 A1 May 18, 2023

Related U.S. Application Data

(60) Provisional application No. 63/279,343, filed on Nov. 15, 2021.

(51) Int. Cl.
*B09C 1/10* (2006.01)
*A01C 21/00* (2006.01)
*A01N 63/22* (2020.01)

(52) U.S. Cl.
CPC ............... *B09C 1/10* (2013.01); *A01C 21/00* (2013.01); *A01N 63/22* (2020.01)

(58) Field of Classification Search
CPC ............ B09C 1/10; A01N 63/22; A01C 21/00
USPC ........................................................ 504/117
See application file for complete search history.

(56) References Cited

U.S. PATENT DOCUMENTS

| | | | |
|---|---|---|---|
| 5,356,861 A | | 10/1994 | Gednalski et al. |
| 6,471,741 B1 | * | 10/2002 | Reinbergen ............. C05G 5/23 71/33 |
| 9,872,490 B2 | * | 1/2018 | Lindner .................. A01N 25/02 |
| 2010/0028974 A1 | * | 2/2010 | Kawabata ............... C05F 11/08 435/267 |
| 2012/0031157 A1 | | 2/2012 | Paikray |
| 2012/0084886 A1 | | 4/2012 | Lopez-Cervantes et al. |
| 2012/0329650 A1 | * | 12/2012 | Lopez-Cervantes ... A01N 63/22 504/292 |
| 2016/0183536 A1 | | 6/2016 | Martin |
| 2018/0325105 A1 | * | 11/2018 | Vadakekuttu .......... A01N 25/14 |
| 2019/0029266 A1 | | 1/2019 | Sawant |
| 2019/0169079 A1 | * | 6/2019 | Le ........................... C12M 29/00 |

FOREIGN PATENT DOCUMENTS

| | | | |
|---|---|---|---|
| CN | 101990398 A | | 3/2011 |
| CN | 110964535 A | | 4/2020 |
| EP | 0439373 | * | 7/1991 |
| EP | 2062969 A1 | | 5/2009 |
| EP | 2582247 B1 | | 12/2018 |
| WO | WO 2020/061326 | * | 3/2020 |

OTHER PUBLICATIONS

Merriam-Webster, definition of "blend"; accessed Mar. 13, 2024, Available online at: www.merriam-webster.com/dictionary/blend.*
Miljakovic et al., The Significance of *Bacillus* spp. in Disease Suppression and Growth Promotion of Field and Vegetable Crops, Microorganisms, vol. 8, (2020), pp. 1-19.*
Merriam-Webster Dictionary, general definition of "carrier," 6a; medical definition of "carrier," 2b; Accessed Aug. 8, 2024, Available online at: www.merriam-webster.com/dictionary/carrier.*
Hemenstine, Solutions, Suspension, Colloids, and Dispersions, The Distinguishing Characteristics That Set These Similar Things Apart, Accessed Aug. 8, 2024, Available online at: www.thoughtco.com/solutions-suspensions-colloids-and-dispersions-608177.*
Bio Reverse, Microsolutions, The Andersons, Inc. (2021).
Biodyne "Crop Residue Management / Compositing / Grass Thatch reduction" Biodyne-USA, LLC (2021) <https://biodyne-usa.com/applications/crop-residue-management-composting-grass-thatch-reduction/> (Accessed Oct. 14, 2021).
"D-COMP Organic Residue Decomposer" D-Comp (2021) <https://dcomp.us> (Accessed Oct. 14, 2021).
"C-COMP Organic Residue Decomposer" Sell Sheet (Downloaded Oct. 14, 2021).
"Bio Reverse Take Back Your Nutrients" The Andersons, Inc. (2021) <https://andersonsplantnutrient.com/agriculture/bioreverse> (Accessed Oct. 14, 2021).
"MeltDown Crop Residue Digester" Biodyne. "Environoc 501, Corn to Corn Environoc 501 Stubble Digester Trial" Biodyne.
Li, L. et al. "Effects of adding Bacillus sp. on crop residue composting and enhancing compost quality" International Journal of Environmental and Rural Development, 2013, vol. 4, No. 2, pp. 115-119 abstract.
International Search Report and Written Opinion issued for PCT/US2022/022787, dated Aug. 11, 2022.
"MeltDown Crop Residue Digester" Biodyne (2017).
"Environoc 501, Corn to Corn Environoc 501 Stubble Digester Trial" Biodyne (2017).
International Search Report and Written Opinion issued for PCT/US2023/085167, dated May 1, 2024.

(Continued)

Primary Examiner — Jennifer M. H. Tichy
(74) Attorney, Agent, or Firm — Foley & Lardner LLP

(57) ABSTRACT

A composition and method for application on plant stubble and plant residue left on a field after harvest where in the composition comprises an alkyl polyglycoside, a betaine-based surfactant or a high fructose corn syrup as a surfactant in a range of approximately 10 to 45 percent by weight; a buffer in sufficient concentration to effect a pH in a range of approximately 0.01-5.0 percent when the composition is in a solution; a suspending agent in a range of approximately 0.01-5.0 percent by weight; a fulvic acid in a range of approximately 0.5 to 1.5 percent by weight: and a *Bacillus* bacteria spore blend suitable for breaking down the plant stubble and plant residue left in the field.

19 Claims, No Drawings

(56) References Cited

OTHER PUBLICATIONS

Sachdev DP, Cameotra SS. Biosurfactants in agriculture. Appl Microbiol Biotechnol. Feb. 2013;97(3):1005-16. doi: 10.1007/s00253-012-4641-8. Epub Jan. 3, 2013. PMID: 23280539; PMCID: PMC3555348.†

\* cited by examiner
† cited by third party

COMPOSITION AND METHOD FOR BREAKING DOWN CROP RESIDUE AND ADDING NUTRIENTS TO SOIL

CROSS-REFERENCE TO RELATED APPLICATION

The present application claims priority to and the benefit of U.S. provisional application Ser. No. 63/279,343, filed on Nov. 15, 2021, the contents of which are hereby incorporated in their entirety.

BACKGROUND

This disclosure relates to the use of an adjuvant along with other compositions to reduce crop residue and to increase nutrients available for the next crop planting.

No-till farming, sometimes known as direct drilling, is an agricultural technique for growing crops without disturbing the soil prior to planting seed. In short, when crops are harvested and the stalks or stems of the agricultural plant are cut, stubble and other plant residue from the cut plants remains on the soil. Even using farming techniques that plow under stubble and plant residue, some stubble and plant residue may be left on the soil surface and extend upward through the soil surface. This stubble and plant residue results in an obstacle and even a barrier for proper seeding when no till or direct drilling technique is used in the following planting season. If the soil was barren, the seeds would be planted at the proper depth. However, if the field has plant residue and stubble, the machinery that presents the seed to the soil and then pushes the seed into the soil rides on the surface of the stubble and plant residue resulting in the seed not being pushed into the soil sufficiently for proper germination or is even left lying on the stubble or crop residue resulting in no germination.

There have been attempts to reduce the stubble, primarily, the height of the stubble. For example, customized machinery can cut the stubble at a lower level. However, stubble is still left standing which continues the obstruction problem to the machinery that plants the seed, if not planting the seed properly for germination. In certain geographical areas, farmers have been known to burn the stubble. However, the disadvantages of burning are a loss of nutrients, a deleterious impact on soil microbes, reduction in soil structure, and increase in erosion and possible increase in soil acidity overtime.

Plant residue also occurs in non-agricultural settings such as grass planted for residential or commercials uses in golf courses, outdoor stadiums and similar commercial applications. Such natural turf requires constant cutting to ensure grass thickness and aesthetic pleasantness. Constant cutting produces thatch which in some situations may become a tightly intermingled layer of living and dead stems, leaves and roots that accumulate over time due to the constant cutting of the living grass. Too great of an accumulation of thatch will result in a lawn or sports field having an unpleasant appearance.

Presently, there are microbial compositions that are designed to reduce residue stubble prior to the next cropping season. One example is a product sold under the trademark of Bio Reverse by The Andersons Inc. of Maumee, Ohio. Another microbial based biodegradation product is sold by a Hefty Seed Company of Baltic South Dakota under the trademark of D-Comp. Two other products are sold by Biodyne World, Inc. of Sarasota, Florida for breakdown of crop residue under the trademarks MELTDOWN and ENVIRON OC 501.

SUMMARY

This disclosure describes a composition for application on plant stubble and plant residue left on a field after harvest wherein the composition comprises an alkyl polyglycoside, a betaine-based surfactant or a high fructose corn syrup as a surfactant in a range of approximately 10 to 45 percent by weight of the composition; a buffer in sufficient concentration to effect a pH in a range of approximately 0.01-5.0 percent when the composition is in a solution; a suspending agent in a range of approximately 0.01-5.0 percent by weight of the composition; a fulvic acid in a range of approximately 0.5 to 1.5 percent by weight of the composition: and a *Bacillus* bacteria spore blend suitable for breaking down the plant stubble and plant residue left in the field.

Furthermore, the alkyl polyglycoside comprises alkyl polyglucoside.

Furthermore, the alkyl polyglucoside is approximately 35 percent by weight of the composition.

Furthermore, the high fructose corn syrup comprises up to approximately 35 percent by weight of the composition.

Furthermore, the organic acid buffer is citric acid, lactic acid, acetic acid, or formic acid.

Furthermore, the organic acid comprises approximately 5 percent by weight of the composition.

Furthermore, the suspending agent functions to maintain the *Bacillus* spores in suspension, and to make the *Bacillus* spores resistant to agglomeration sufficiently such that the bacteria spores revert to bacteria and multiply to sufficient numbers to breakdown the plant stubble and plant residue.

Furthermore, the suspending agent comprises an anionic agent comprising xanthan gum, guar gum, acrylate copolymes, alkali swellable emulsion or maleic anhydride decadiene crosspolymer, or nonionic agent comprising hydrophobically modified polyurethane, hydrophobically modified polyethers, carboxymethyl cellulose, hydroxyethylcellulose, hydroxypropyl cellulose, hydroxypropylmethyl cellulose, methylcellulose, microfibrillated cellulose, or chemically modified cellulose or inorganic suspending agent comprising attapulgite or fumed silica, or a suspending agent comprising lignin sulfonate, naphthalenesulfonate formaldehyde condensate, EO-PO-EO block copolymer, EO-PO block copolymer, tristyrylphenol ethoxylate, phosphate ester, acrylic graft copolymer, or styrene acrylic copolymer, or combinations thereof.

Furthermore, the suspending agent comprises approximately 5 percent by weight of the composition.

Furthermore, the fulvic acid comprises potassium fulvate in the approximate range of 0.5 to 1.5 percent by weight of the composition.

Furthermore, the fulvic acid comprises approximately 1.00 percent by weight of the composition.

Furthermore, the *Bacillus* blend of spores comprises spores of *Bacillus coagulans, Bacillus* subtils, *Bacillus pumilis, Bacillus megaterium* and *Bacillus amyloliquefaciens*.

Furthermore, the *Bacillus coagulans, Bacillus subtils, Bacillus pumilis, Bacillus megaterium* and *Bacillus amyloliquefaciens* are each at approximately a concentration of $3 \times 10^7$ CFUs per gram.

Furthermore, the bacteria blend is sufficient to breakdown the plant stubble and plant residue thereby increasing total nitrogen, phosphate and potassium soil content when compared to untreated soil.

This disclosure also describes a method for reducing plant stubble and plant residue left on the field after harvest and increasing nutrients in the soil from the breakdown of the plant stubble and plant residue. The method comprises applying a composition on the plant stubble and plant residue a composition comprising an alkyl polyglycoside, a betaine-based surfactant or a high fructose corn syrup as a surfactant in a range of approximately 10 to 45 percent by weight of the composition; a buffer in sufficient concentration to effect a pH in a range of approximately 0.01-5.0 percent when the composition is in a solution; a suspending agent in a range of 0.01-5.0 percent by weight of the composition; a fulvic acid in a range of approximately 0.5 to 1.5 percent by weight of the composition: and a *Bacillus* bacteria spore blend suitable for breaking down the plant stubble and plant residue left in the field.

Furthermore, the method comprises that the alkyl polyglycoside comprises alkyl polyglucoside.

Furthermore, the method comprises that the alkyl polyglucoside comprises approximately 35 percent by weight of the composition.

Furthermore, the method comprises that the high fructose corn syrup is up to approximately 35 percent by weight of the composition.

Furthermore, the method comprises that the organic acid buffer comprises citric acid, lactic acid, acetic acid, or formic acid.

Furthermore, the method comprises that the organic acid comprises approximately 5 percent by weight of the composition.

Furthermore, the method comprises that the suspending agent functions to maintain the *Bacillus* spores in suspension, and to make the *Bacillus* spores resistant to agglomeration sufficiently such that the bacteria spores revert to bacteria and multiply to sufficient numbers to breakdown the plant stubble and plant residue.

Furthermore, the method comprises that the suspending agent comprises an anionic agent comprising xanthan gum, guar gum, acrylate copolymes, alkali swellable emulsion or maleic anhydride decadiene crosspolymer, or nonionic agent comprising hydrophobically modified polyurethane, hydrophobically modified polyethers, carboxymethyl cellulose, hydroxyethylcellulose, hydroxypropyl cellulose, hydroxypropylmethyl cellulose, methylcellulose, microfibrillated cellulose, or chemically modified cellulose or inorganic suspending agent comprising attapulgite or fumed silica, or a suspending agent comprising lignin sulfonate, naphthalenesulfonate formaldehyde condensate, EO-PO-EO block copolymer, EO-PO block copolymer, tristyrylphenol ethoxylate, phosphate ester, acrylic graft copolymer, or styrene acrylic copolymer, or combinations thereof.

Furthermore, the method comprises that the suspending agent comprises approximately 5 percent by weight of the composition.

Furthermore, the method comprises that the fulvic acid comprises potassium fulvate in the approximate range of 0.5 to 1.5 percent by weight of the composition.

Furthermore, the method comprises that the fulvic acid comprises approximately 1.00 percent by weight of the composition.

Furthermore, the method comprises that the *Bacillus* blend of spores comprises spores of *Bacillus coagulans, Bacillus* subtils, *Bacillus pumilis, Bacillus megaterium* and *Bacillus amyloliquefaciens.*

Furthermore, the method comprises that the *Bacillus coagulans, Bacillus* subtils, *Bacillus pumilis, Bacillus megaterium* and *Bacillus amyloliquefaciens* are each at approximately a concentration of $3 \times 10^7$ CFUs per gram.

Furthermore, the method comprises that the bacteria blend is sufficient to breakdown the plant stubble and plant residue thereby increasing total nitrogen, phosphate and potassium soil content when compared to untreated soil.

DETAILED DESCRIPTION

This disclosure includes a composition for application in the field to break down crop residue thereby improving planter performance and releasing nutrients back into the soil. The composition is most beneficial in reduced tillage situations wherein crop residue remains lying on the field after harvest and will not be plowed under. Such crop residue obstructs consistent and selected seed planting. The composition is also useful for reducing thatch in grass lawns, both residential and commercial settings and for degrading manure that is spread on fields.

When applied to the soil after the crop has been harvested, the composition of this disclosure breaks down stubble and crop residue left after the crop has been harvested. The composition breaks down plant stubble and plant residue to an extent such that seed may be planted in the planting furrow at a consistent selected depth and at a consistent selected seed spacing. Selected seed depth may vary with plant species, for example corn and soybean seeds are planted at different depths. Soil to seed contact is improved since the previous harvest's stubble and other residue has been broken down and eliminated. Soil type and moisture are also factors for consideration in seed depth. Planting seeds at the selected optimal depth consistently greatly improves seed germination and therefore yield. In addition, if stubble or other crop residue obstructs placement of a seed into the soil, then a nonproductive space occurs within a seed row. If such a nonproductive space occurs frequently, yields can be affected considerably.

The composition of this disclosure includes a surfactant, an organic acid, rheology and suspending agents, fulvic acid and spores of selected *Bacillus* bacteria. The composition is in an aqueous solution in its preferred form.

The selected blend of bacteria spores when applied to the field reverts to bacteria which then multiply sufficiently to stimulate and fortify biological activity that breaks down the stubble and other crop residue, releasing available nutrients directly into the field. In one example up to approximately 30 to 40 lbs. of nitrogen, approximately 5 to 10 lbs. of phosphorus, and approximately 35 to 40 lbs. of potassium were added to the soil per acre and available for the next crop.

To greatly aid the selected blend of bacteria into attaching to the stubble and crop residue, a surfactant such as alkyl polyglucoside is used. The surfactant of this disclosure greatly enhances the bacterial function by acting as a coating thereby providing a method of attaching the bacterial spores to the stubble and crop residue and also providing a carbohydrate source for the *Bacillus* bacteria to germinate from dormancy into a reproductive stage and then to multiply to sufficient numbers to breakdown the stubble and crop residue as described herein.

A surfactant improves wettability and penetration of the spray solution when in contact with crop residue. This results in an increase in permeation of the microbes into the crop residue significantly increasing performance and the viability of microbes. A surfactant is a compound that reduces interfacial tensions between two liquids or between a liquid and a solid. On a molecular level, surfactants are typically molecules containing one portion that is polar and one portion that is non-polar. The polar, water-soluble portion is sometimes referred to as hydrophilic ("water loving") while the non-polar, water-insoluble portion is sometimes referred to as hydrophobic ("water hating") or lipophilic ("fat loving"). Surfactants are sometimes referred to as amphiphilic because of their dual character.

Suitable surfactants are soluble in water, have a hydrophilic-lipophilic balance (HLB) greater than about 10, are environmentally friendly (relatively low in toxicity to plants and animals) and are non-toxic to microbes and microbial spores. Preferred surfactants include: alkyl glucloside, alkyl polyglucoside, alkyl glucamides, ammonium lauryl sulfate, alkylpolyglucaside esters (coco-glucaside citrate, coco-glucoside tartrate); alkyl-sulfosuccinates; alkyl-benylsulfonates, etc.

In one example, an alkyl polyglucoside C8-10 or C9-11 from Stepan of Northfield, Ill. at an approximate concentration of 35 percent by weight of the total composition was used and found suitable. In addition, a betaine-based surfactant, such as Amphosol DM-X, (from Stepan) which is a C12-16 betaine, j substituted fatty alkylammonium alkyl carboxylate, was also found suitable at an approximate 35 percent by weight concentration of the composition. Other polyglycosides are also contemplated as suitable surfactants. A range of approximately 10-45 percent by weight of the composition for all surfactants is within the scope of this disclosure. Furthermore, a high fructose corn syrup up to approximately 35 percent by weight of the composition (such as Iso Clear 55 from Cargill, Inc. of Wayzata, Minnesota) is also believed to be suitable as a surfactant. By high fructose corn syrup is meant corn syrup that has been processed to contain approximately 55 percent fructose by weight.

The "solution" has a pH of about from 0 to 5, preferably between 1.5 to 4 with buffering capacity between the pH values of 2 to 4.5. The solution should include adequate buffering agents to maintain a pH between 1.5 to 4 upon diluting in water at ratios as between 1:5 to as high as 1:200.

The desired pH in the "solution" is achieved by including a suitable buffers. Suitable buffers will have at least one function group with a pKa value between 2.5 to 5. A pKa value is defined as the negative of the logarithm of the equilibrium constant Ka for the reaction $$HA \rightleftharpoons H+ + A-$$

i.e., $$Ka = [H+][A-]/[HA]$$

where [H+], etc. represent the concentrations of the respective species in mol/L. It follows that pKa=pH+ log[HA]−log[A-], so that a solution with 50% dissociation has pH equal to the pKa of the acid.

Suitable buffers include but are not limited to amino acids, carboxylic acids, phosphoric acids and their derivatives, phosphonic acids and their derivatives, sulfonic acids and their derivatives.

Preferred buffering agents are relatively low in cost, readily available, and environmentally friendly (relatively low in toxicity to plants and animals). Preferred buffering agents include lactic acid, citric acid, fulvic acid, ligninsulfonic acid, phosphorus acid, phosphoric acid, acetic acid, malic acid, citric acid, glycolic acid, gluconic acid, glucoheptonic acid, fulvic acid, humic acid, and salicylic acid.

The rheology modifying agent and/or suspending agents in the composition of this disclosure function preferably together to maintain the *Bacillus* spores in suspension, and to make the *Bacillus* spores resistant to agglomeration. For purposes of this application the phrase "rheology modifying agent and/or suspending agent(s)" will be used to refer to one or several agents as described herein to provide the function of suspending the *Bacillus* spores. Agglomeration of spores increases their effective particle size, making it more difficult to remain in suspension. The rheology modifying agent and/or suspending agents can function to suspend *Bacillus* spore particles through the mechanism of producing high yield-stress fluids that have limited effect on viscosity, or through the mechanism of viscosity.

The rheology modifying agent can either produce high performance at low viscosity or can produce a high viscosity fluid that has high shear thinning properties and is very pseudo-plastic or thixotropic. The suspending agents can be nonionic, cationic or anionic.

Suitable anionic suspending and/or rheology modifying agents include without limitation xanthan gums, guar gums, acrylate copolymers, alkali swellable emulsions (ASE) and (maleic anhydride decadiene) crosspolymer.

Suitable nonionic suspending agents include without limitation hydrophobically modified polyurethanes (HEUR), hydrophobically modified polyethers (HPME), cellulose ethers, such as carboxymethyl cellulose, hydroxyethylcellulose, hydroxypropyl cellulose, hydroxypropylmethyl cellulose, and methylcellulose, microfibrillated cellulose, chemically modified cellulose.

Suitable inorganic suspending agents include without limitation organoclays, such as attapulgite, and fumed silicas.

Suitable suspending agents include without limitation lignin sulfonates, naphthalenesulfonate formaldehyde condensates, EO-PO-EO block copolymers, EO-PO block copolymers, tristyrylphenol ethoxylates, phosphate esters, acrylic graft copolymers, styrene acrylic copolymers.

Combinations of the foregoing suspending agents and/or rheology modifying agents can also be employed.

The suspending and/or rheology modifying agent may constitute about 0.01-5.0 percent by weight of the composition concentrated product. The selected effective amount of the suspending and/or rheology modifying agent depends largely on the activity of the suspending agent.

Fulvic acid in the form of Potassium fulvate is part of the composition of this disclosure at an approximate level of approximately 1.00 percent by weight of the composition. A suitable effective amount of fulvic acid is approximately 0.5 to 1.5 percent by weight of the composition.

The composition of this disclosure includes a consortium of *Bacillus* bacteria that have been originally derived from the soil. In one embodiment, the consortium of *Bacillus* bacteria includes the following, all being at a concentration of $3 \times 10^7$ CFUs per gram. The bacteria in the consortium work together to breakdown cellulose and other structural components of plant residue. The consortium of *Bacillus* bacteria includes the following along with the function of each *Bacillus* bacteria in this consortium:

*Bacillus licheniformis*: *Bacillus licheniformis* produces enzymes that break the chemical bonds between carbon molecules in the stubble and crop residue.

*Bacillus coagulans*: In this bacterial consortium *Bacillus coagulans* controls the production of lactic acid and the pH of the solution that the microbes swim in. Microbes in the presence of *Bacillus coagulans* are able to be more effective breaking down cellulose and less soluble complex carbon structures.

*Bacillus subtills*: *Bacillus* subtils provides protection from pathogens and predatory microbes that consume other microbes in the consortium.

*Bacillus pumilis*: *Bacillus pumilis* releases phosphate and potassium from the stubble, crop residue and soil.

*Bacillus megaterium*: *Bacillus megaterium* produces enzymes that solubilize and breakdown carbon bonds in the stubble and crop residue.

*Bacillus amyloliquefaciens*: *Bacillus amyloliquefaciens* produces enzymes that solubilize and breakdown carbon bonds in the stubble and crop residue. The enzymes produced can breakdown tough cellulose.

The consortium of *Bacillus* bacteria of the composition of this disclosure breaks down the plant cells. As the plant cells are broken down the cells leak nitrogen, potassium, phosphate, zinc, manganese, copper, sulfur, and other nutrients. The amount of nutrients release dover a given amount of time depends on the temperature, nutrient content of the stubble and crop residue, and the amount of nitrogen present to feed the reaction.

In general, it has been found that the amount of phosphate released by the composition of this disclosure was between about five and ten times higher than control levels. Potassium was released about between 50 percent and 100 percent higher than the release of the control. It has also been found that form of potassium released by corn stubble was about 3 times more available to plants than the potassium found in regular potash applied as fertilizer. Nitrogen was up to about 5 times higher in the leachate from corn stubble treated with the composition of this disclosure.

The following table shows results of one test using the composition of this disclosure on corn stubble and residue, testing the soil for the nutrients indicated.

TABLE

| SAMPLE ID | Nutrient | | | | |
|---|---|---|---|---|---|
| | Total Nitrogen | $NO_3$ | $NH_4$ | Phosphate | Potassium |
| 15 days UT | 44.78 | 36.74 | 8.04 | 3.37 | 216.31 |
| 15 days TR | 275.78 | 34.86 | 240.92 | 116.57 | 322.46 |
| 30 days UT | 53.89 | 45.99 | 7.90 | 5.36 | 178.91 |
| 30 days TR | 259.85 | 16.71 | 243.14 | 270.20 | 564.79 |

Values in the above table are in parts per million.

Samples of the soil at a depth of 0 to 12 inches were taken 15 days after treatment with the composition of this disclosure (TR) applied and a sample of the soil untreated (UT). Samples were also taken 30 days after treatment both of treated soil and untreated soil. As the table indicates total nitrogen, $NH_4$, phosphate and potassium levels greatly increased in the soil both 15 days and 30 days after treatment. Total nitrogen was increased 6-fold, ammonium ($NH_4$) was increased 30-fold, phosphate was increased 34-fold and potassium was increased 1.5-fold after 15 days when compared to untreated soil. While after 30 days of treatment, total nitrogen was increased more than 4-fold, ammonium (NH4) was increased 31-fold, phosphate was increased 50-fold and potassium was increased 3-fold when compared to untreated soil.

What is claimed is:

1. An aqueous solution for application on plant stubble and plant residue left on a field after harvest, the aqueous solution comprising a first composition and water; wherein:
   the first composition comprises:
      10 to 45 wt % of a surfactant comprising an alkyl polyglycoside, a betaine-based surfactant, or a high fructose corn syrup based on the total weight of the first composition;
      a buffer comprising at least one functional group with a pKa value of −2.5 to 5, and wherein the buffer is present in an amount sufficient to maintain a pH of the aqueous solution from 0 to 5;
      0.01 to 5.0 wt % of a suspending agent based on the total weight of the first composition;
      a total of 0.5 to 1.5 wt % of fulvic acid and/or potassium fulvate based on the total weight of the first composition;
      a *Bacillus* bacteria spore blend of different species of *Bacillus* spores suitable for breaking down the plant stubble and plant residue; and
      the *Bacillus* bacteria spore blend comprises spores of *Bacillus coagulans, Bacillus subtilis, Bacillus pumilis, Bacillus megaterium*, and *Bacillus amyloliquefaciens* each present at at least $3 \times 10^7$ CFUs per gram of the first composition.

2. The aqueous solution of claim 1, wherein the alkyl polyglycoside comprises alkyl polyglucoside.

3. The aqueous solution of claim 2, wherein the first composition comprises 35 wt % of the alkyl polyglucoside.

4. The aqueous solution of claim 1, wherein the first composition comprises 10 to 35 wt % of the high fructose corn syrup.

5. The aqueous solution of claim 1, wherein the buffer comprises is an organic acid buffer comprising citric acid, lactic acid, or formic acid.

6. The aqueous solution of claim 1, wherein the suspending agent comprises:
   an anionic agent comprising xanthan gum, guar gum, acrylate copolymers, alkali swellable emulsion or maleic anhydride decadiene crosspolymer;
   a nonionic agent comprising hydrophobically modified polyurethane, hydrophobically modified polyethers, carboxymethyl cellulose, hydroxyethylcellulose, hydroxypropyl cellulose, hydroxypropylmethyl cellulose, methylcellulose, microfibrillated cellulose, or chemically modified cellulose;
   an inorganic suspending agent comprising attapulgite or fumed silica;
   a lignin sulfonate;
   a naphthalenesulfonate formaldehyde condensate;
   a EO-PO-EO block copolymer;
   an EO-PO block copolymer;
   tristyrylphenol ethoxylate;
   a phosphate ester;
   a acrylic graft copolymer;
   a styrene acrylic copolymer;
   or a combination of any two or more thereof.

7. The aqueous solution of claim 1, wherein the first composition comprises 5.0 wt % of the suspending agent.

8. The aqueous solution of claim 1, wherein the first composition comprises the potassium fulvate.

9. The aqueous solution of claim 8, wherein the first composition comprises 1.00 wt % of the potassium fulvate.

10. A method for reducing plant stubble and plant residue left on a field after harvest and increasing nutrients in the soil from the breakdown of the plant stubble and plant residue, the method comprising:
applying an aqueous solution to the plant stubble and plant residue;
wherein:
the aqueous solution comprises a first composition and water;
the first composition comprises:
10 to 45 wt % of a surfactant comprising an alkyl polyglycoside, a betaine-based surfactant, or a high fructose corn syrup based on the total weight of the first composition;
a buffer comprising at least one functional group with a pKa value of −2.5 to 5, and wherein the buffer is present in an amount sufficient to maintain a pH of the aqueous composition from 0.01 to 5.0;
0.01 to 5.0 wt % of a suspending agent based on the total weight of the first composition;
a total of 0.5 to 1.5 wt % of fulvic acid and/or potassium fulvate based on the total weight of the first composition;
a *Bacillus* bacteria spore blend of different species of *Bacillus* spores suitable for breaking down the plant stubble and plant residue; and
the *Bacillus* bacteria spore blend comprises spores of *Bacillus coagulans, Bacillus subtilis, Bacillus pumilis, Bacillus megaterium,* and *Bacillus amyloliquefaciens* each present at at least $3\times10^7$ CFUs per gram of the first composition.

11. The method of claim 10, wherein the alkyl polyglycoside comprises alkyl polyglucoside.

12. The method of claim 11, wherein the first composition comprises 35 wt % of the alkyl polyglucoside.

13. The method of claim 10, wherein the first composition comprises 10 to 35 wt % high fructose corn syrup.

14. The method of claim 10, wherein the buffer comprises an organic acid buffer comprising citric acid, lactic acid, acetic acid, or formic acid.

15. The method of claim 14, wherein the first composition comprises 5 wt % of the organic acid buffer.

16. The aqueous solution of claim 10, wherein the suspending agent comprises:
an anionic agent comprising xanthan gum, guar gum, acrylate copolymers, alkali swellable emulsion or maleic anhydride decadiene crosspolymer;
a nonionic agent comprising hydrophobically modified polyurethane, hydrophobically modified polyethers, carboxymethyl cellulose, hydroxyethylcellulose, hydroxypropyl cellulose, hydroxypropylmethyl cellulose, methylcellulose, microfibrillated cellulose, or chemically modified cellulose;
an inorganic suspending agent comprising attapulgite or fumed silica;
a lignin sulfonate;
a naphthalenesulfonate formaldehyde condensate;
a EO-PO-EO block copolymer;
an EO-PO block copolymer;
tristyrylphenol ethoxylate;
a phosphate ester;
a acrylic graft copolymer;
a styrene acrylic copolymer;
or a combination of any two or more thereof.

17. The method of claim 10, wherein the first composition comprises 5.0 wt % of the suspending agent.

18. The method of claim 10, wherein the first composition comprises the potassium fulvate.

19. The method of claim 18, wherein the first composition comprises 1.00 wt % of the potassium fulvate.

* * * * *